Patented Mar. 1, 1938

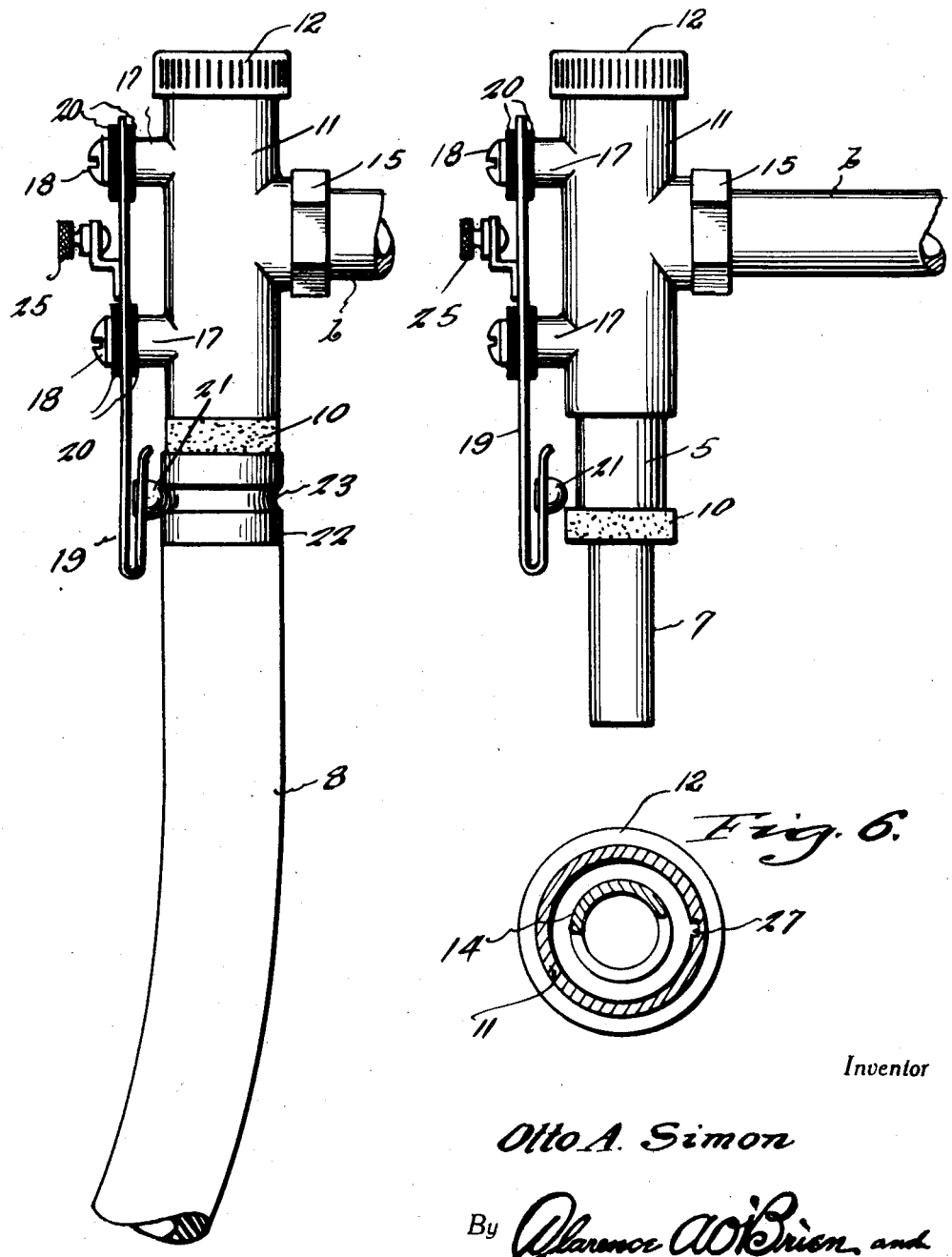

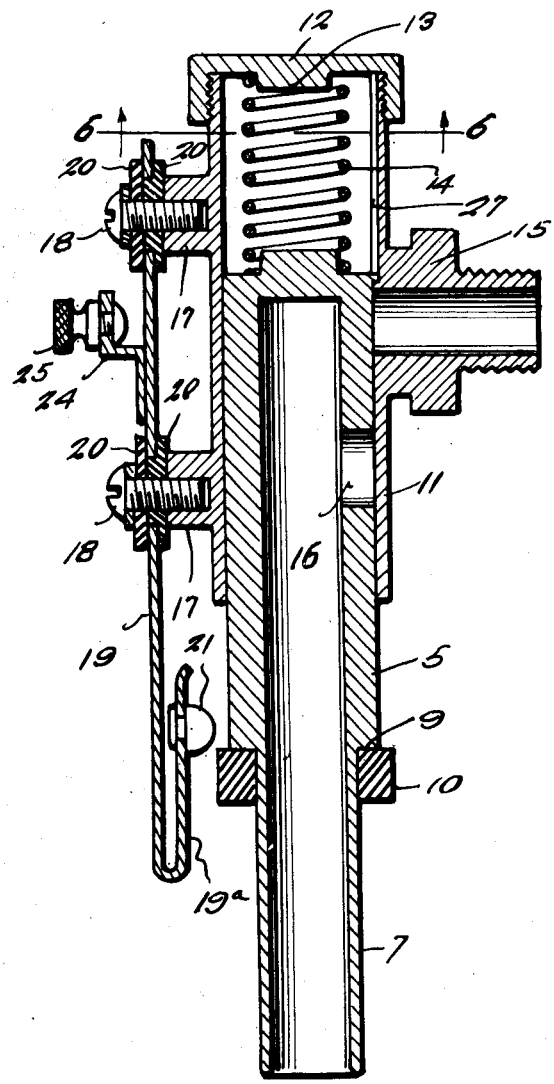

2,109,511

UNITED STATES PATENT OFFICE 2,109,511

AUTOMATIC VACUUM CONTROL VALVE FOR MILKING APPARATUS

Otto A. Simon, Butte, Mont., assignor of one-third to Richard J. Simon, Butte, Mont.

Application February 11, 1936, Serial No. 63,417

1 Claim. (Cl. 173—326)

This invention relates to improvements in milking apparatus and particularly to that type of apparatus commonly known as the pulsating pressure and vacuum type.

More particularly the invention is concerned with the provision of an improved control valve used in connecting one end of the vacuum hose leading from the milk receptacle of the apparatus to the vacuum pipe line connected with the vacum pump of the apparatus.

In accordance with the present invention the valve is provided whereby communication will be effected between the vacuum hose and the pipe line incidental to an attaching of the hose to the valve.

Further in accordance with the present invention the valve of the invention will move to a closed position incidental to a separation or disconnection of the vacuum hose and the valve of the invention.

The invention together with its objects and advantages will be best understood from a study of the following description taken in connection with the accompanying drawings wherein:

Figure 1 is an elevational view illustrating the application of the invention and with the vacuum hose connected with the valve.

Figure 2 is a view similar to Figure 1 with the hose omitted.

Figure 3 is a longitudinal sectional view through the valve in closed condition.

Figure 4 is an elevational view of the core of the valve.

Figure 5 is an end elevational view of the core, and

Figure 6 is a detail view taken substantially on the line 6—6 of Figure 3.

Referring to the drawings by reference numerals it will be seen that the improved valve comprises a substantially cylindrical core 5 that is hollow, and is closed at one end and open at its relatively opposite end.

The closed portion of the core 5 has a sliding fit within a valve casing or shell 11 one end of which is provided with a threaded cap 12 as shown. Interposed between the inner end of the core 5 and the cap 12 is a coil spring 14 one end of which is disposed about an internal lug 13 provided on the cap 12 and the other end of which is disposed about a lug or boss 6 provided at the closed end of the core 5. Spring 14 normally urges the core 5 downwardly to normally retain the port 16 provided in the core 5 out of alinement with the inlet port of the casing 11, said inlet port being in the form of a nipple 15 adapted to be threadedly engaged with a branch b of the vacuum pipe line leading from the vacuum pump of the apparatus (neither the line per se nor the pump being illustrated).

Core 5 has a reduced end 7 forming intermediate the ends of the core a shoulder 9 against which seats a gasket 10 which serves to render airtight the connection between the end 7 of the core and the end of the vacuum hose 8, which latter leads from the usual milk receptacle of the milking apparatus.

Further in accordance with the present invention the end of the hose 8 to be connected with the valve is provided with a metallic sleeve 22 formed with a groove 23 which as hereinafter made manifest serves as a keeper groove.

Also casing 11 has projecting therefrom vertically spaced, threaded bosses 17 for the reception of screws 18 which serve to secure to the bosses 17 a spring latch plate or member 19 insulated from the bosses 17 and the screws 18 as at 20.

At one end the spring latch member 19 is formed with a return bend 19a equipped with a ball like projection or the like 21 which as clearly shown in Figure 1 is adapted to engage in the groove 23 of the metallic sleeve 22 for releasably securing the end of the hose 8 engaged with the end 7 of the core and also to releasably retain the core in the position shown in Figure 1, in which position port 16 of the core is in alinement with the nipple 15 to provide for a through passage through the valve between the vacuum pipe line and the hose 8.

From the description of the invention thus far it will be seen that normally valve core 5 is in the position shown in Figure 3 to prevent loss of vacuum in the pipe line. When the milking machine is in use the free end of the hose 8 is slipped on to the end 7 of the core 6 and incidental to this operation core 5 will be caused to move upwardly against the action of spring 14 and inwardly of the casing 11 until gasket 10 is brought into abutment with the end of the casing 11 at which time the projection or head 21 of the latch member 19 will spring into locking engagement with the groove 23 of the band or sleeve 22 thus releasably locking the parts in the position shown in Figure 1 and with the port 16 in registry with the nipple 15.

After the milking has been completed the end of the hose 8 is slipped off the end 7 of the core 5 and in effecting a separation of the hose 8 and core 5 a pull will be exerted on the core forcing the head 21 out of the groove 23 so that the core 5 will under action of spring 14 move to the position shown in Figure 3 which is the closed position of the valve for cutting off or preventing any leakage of vacuum from the pipe line.

From the above it will be seen that I provide a valve which is normally closed and which will be open incidental to a connection of the vacuum hose therewith, and which will be closed incidental to an uncoupling of the hose and valve.

The valve of the present invention is particularly adapted for use with that type of milking apparatus known commonly in the art as the "De Laval magnetic milker", and for use with such type of milker there is provided a binding post 25 mounted on an angular bracket 24 welded or otherwise secured in any suitable manner to the spring latch member 19 as shown. The binding post 25 is provided for the electrical connection therewith of a wire which runs from the vacuum pump of the apparatus to be electrically connected with wires generally carried by the vacuum hose corresponding to the hose 8 shown in the drawings, and which latter wires are connected with a plate forming part of the pulsator (not shown) forming part of the aforementioned type of milking apparatus.

Thus it will be seen that with my invention the wires with which the hose are usually equipped may be electrically connected with the sleeve 22 and when this sleeve is engaged in the manner hereinbefore described by the head 21 of the latch member 19 said sleeve 22, head 21 and latch member 19 will serve as conductors, all of these members being formed of suitable conductive material. Thus provision is made for a maintenance of the electrical circuit as long as the valve is in retracted or open position, it being understood of course that the maintenance of this circuit under such conditions is desired and necessary for a proper operation of the type of milker above referred to.

To prevent relative rotation of core 5 and casing 11, said core is provided with a lug 26 that engages in an internal groove 27 in the wall of the casing, as shown in Figure 3.

Having thus described the invention, what is claimed as new is:

In a valve of the character described, a tubular casing, said casing being provided with a lateral port, a hollow tubular core having a sliding fit within said casing and provided with a lateral port for registry with the first named port, spring means arranged within the casing and interposed between one end of the casing and one end of said core for normally urging the core axially outwardly with respect to said casing, a hose end adapted to be slipped on to one end of said core, said hose end being provided with a metallic sleeve contacting the core, and said sleeve also being equipped with a groove, and a resilient latch member fixedly mounted on said casing and insulated therefrom and having a head portion adapted to engage in said groove for releasably retaining said hose and core coupled together with the core in its inwardmost position relative to the valve casing, said latch member having an electrical terminal secured thereto and said sleeve and latch providing an electric connection between the casing and the terminal when the latch is in engaged position.

OTTO A. SIMON.